3,260,753
CATALYTIC PROCESS FOR PREPARING ACROLEIN

Edgar L. McDaniel and Howard S. Young, Kingsport, Tenn., assignors to Eastman Kodak Company, Rochester, N.Y., a corporation of New Jersey
No Drawing. Filed Oct. 14, 1963, Ser. No. 316,159
18 Claims. (Cl. 260—604)

This invention relates to a process for the production of unsaturated aliphatic aldehydes, and in particular to the production of acrolein and methacrolein by the oxidation of propylene and isobutylene, respectively, at an elevated temperature in the vapor phase with oxygen in the presence of bismuth oxide and silicovanadotungstic acid as a catalyst.

While a number of catalytic processes involving air oxidation of propylene or isobutylene, in the presence of certain metallic oxide catalysts, have been proposed for the preparation of acrolein and methacrolein, respectively, most of these processes have not proven entirely satisfactory for commercial applications primarily because of the difficulty of maintaining the catalysts in a selectively active condition over long periods of reaction time. This requirement of long-life catalysts is recognized as being particularly necessary for continuous manner of operations.

We have now found that by passing a mixture of propylene or isobutylene and oxygen, in certain proportions, at elevated temperatures and in the vapor phase over bismuth oxide and silicovanadotungstic acid as a catalyst, that the propylene is oxidized to acrolein and water, with some acetaldehyde also being produced as a by-product and that the isobutylene is oxidized to methacrolein and water. The products can be readily recovered from the effluent stream from the reactor by known procedures. The reaction goes smoothly. Further the catalyst composition retains its activity and selectivity over relatively long-life periods without appreciable physical deterioration thereby permitting an efficacious use thereof for the production of acrolein from propylene or of methacrolein from isobutylene in a continuous manner, especially in the case of use in a fluidized bed type of reactor.

It is, accordingly, an object of the invention to provide a novel and improved process for the synthesis of unsaturated aliphatic aldehydes from olefins and oxygen.

Another object is to provide a novel vapor phase process for converting a mixture of propylene and oxygen to acrolein. Another object is to carry out the conversion to acrolein in a continuous process.

Another object is to provide a novel catalyst composition for promoting the conversion of propylene and oxygen to acrolein comprising bismuth oxide and silicovanadotungstic acid.

Another object is to provide a novel process for the preparation of methacrolein.

Other objects will become apparent from the general description and examples hereinafter.

In accordance with the invention, we prepare unsaturated aliphatic aldehydes by passing a feed mixture comprising propylene or isobutylene and oxygen at an elevated temperature in the vapor phase over a catalyst containing bismuth oxide and silicovanadotungstic acid. Feed mixtures containing both propylene and isobutylene can be employed but there appears to be no advantage in using such a mixture because a mixture of unsaturated aliphatic aldehydes would be obtained. The reaction is illustrated below with propylene conversion to acrolein:

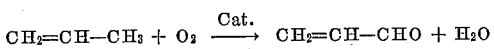

As previously indicated, a minor proportion of acetaldehyde is also formed.

The ratios of the reactants may be varied over a relatively wide range, but should be maintained at all times outside the explosive range, and inclusion of water which has been found to be neither beneficial nor harmful in terms of conversion and yield may be used to this end. The mole ratio of propylene or isobutylene to oxygen may range from 1:0.2 to 1:5, although the preferred range is from 1:0.5 to 1:2. The oxygen may be fed as air, or in admixture with other inert gases such as nitrogen, argon, carbon dioxide, water vapor, or the like. The temperature of the reaction can also be varied within the relatively wide limits of from 250–550° C., but the preferred range is from 300–450° C. The reaction is not significantly pressure dependent, and pressures up to 5 atmospheres may be used. The gaseous hourly space velocity (GHSV) may be varied over a wide range, for example values (STP) from about 100–6000, but preferably from 200–1000. The reaction may be carried out in fixed or fluidized catalyst beds. However, since the reaction is highly exothermic, it is of some advantage to use a fluidized catalyst bed wherein the catalyst exists as small particles which are suspended in an upflowing stream of reactant gas.

The heteropoly acid used to prepare the preferred catalyst compositions is silicovanadotungstic acid represented by the empirical formula $H_8SiV_2W_{10}O_{41}$. The silicovanadotungstic acid is intimately mixed with bismuth oxide ($Bi_2O_3$) or with a bismuth compound such as bismuth nitrate, bismuth subcarbonate, bismuth hydroxide, bismuth oxalate, bismuth tetroxide, bismuth pentoxide, bismuth oxysulfate, etc., which is converted, at least in part, to bismuth oxide when the resulting mixture is calcined at from 450–600° C. for a period of several hours or more. The calcined mixture is then reduced to operable granules or particles. Preferably the calcining operation is carried out in the presence of air or other suitable oxygen-containing gaseous mixture. However, it can be conducted in the absence of oxygen. The ammonium salt of the heteropoly acid can also be used in the preparation of the catalyst. The exact relationship of the bismuth and heteropoly acid components in the catalyst composition is not known. It may be that the bismuth oxide forms a salt with the heteropoly acid, and that part or all of the catalytic activity results from any such salt. The concentrations of the heteropoly acid component and the bismuth component (expressed as $Bi_2O_3$) can vary from about 5 to about 75% by weight and from about 5 to about 60% by weight, respectively, and preferably from 10 to about 50% by weight, based on the mixture. Advantageously, the catalyst is supported on conventional carriers such as silica or silica gel, alumina, silica-alumina, kieselguhr, pumice, titania, zirconia, magnesia, clay, etc. Ratios of vanadium to tungsten other than the preferred 2:10 ratio shown in the examples which follow may also be used in the heteropoly acid. The catalyst may be regenerated by treatment with air or a gas containing molecular oxygen at or above the reaction temperature.

In practicing the invention, any of the conventional types of apparatus suitable for carrying out the process of the invention in the vapor phase can be employed including, for example, a tubular type of fluidized or fixed bed reactor or furnace which can be operated in continuous or intermittent manner and which is equipped to contain the catalyst in intimate contact with the entering feed gases. The effluent gases are then conducted to suitable condensing and separatory equipment for recovering the aldehyde products. Advantageously, the reaction is periodically interrupted to regenerate the catalyst by feeding into the reactor a stream of air or gases containing molecular oxygen and noncombustibles at or above reaction temperatures. The fluidized bed reactor employed by us in carrying out the process of the following examples, consisted of a cylindrical tube of Vycor glass of 15 inches length with a conical bottom and having an internal diameter in the lower portion of 40 mm. for 25 cm. of height and a diameter of 55 mm. in the upper portion of the reactor. The feed gases are directed into the bottom of the reactor serving thereby to "fluidize" the catalyst. The reactor was heated electrically. Any other suitable method of heating the reactor can be employed.

The definitions of certain terms used in the examples are as follows:

Contact time is the average time which the reactants spend at reaction conditions in a volume equal to that of the catalyst bed.

The percent conversion of propylene to acrolein =

$$\frac{\text{moles of acrolein formed}}{\text{moles of propylene fed}} \times 100$$

The percent yield of acrolein =

$$\frac{\text{moles of acrolein formed}}{\text{moles of propylene consumed}} \times 100$$

This invention is further illustrated by the following examples of preferred embodiments thereof although it will be understood that these examples are included primarily for purposes of illustration and are not intended to limit the scope of the invention unless otherwise specifically indicated:

Example 1

Silicovanadotungstic acid ($H_8SiV_2W_{10}O_{41}$) was prepared in the following manner: A solution was prepared which contained 38 g. of sodium hydroxide and 112 g. of ammonium metavanadate in 500 ml. of water, and the solution was boiled and stirred for two hours. Then 56 g. of sodium metasilicate was added to the hot solution.

A second solution was prepared which contained 330 g. of sodium tungstate dihydrate in 600 ml. of water. The latter solution was stirred and boiled while 330 g. of tungstic acid ($H_2WO_4$) was added over a 15 minute period, and the resulting turbid solution was boiled for two hours.

These two solutions were filtered while hot, again brought to the boiling point, and mixed into a 2-l. round-bottomed flask equipped with heating mantle, reflux condenser, and magnetic stirrer. Fifty milliliters of 1:1 sulfuric acid was added, and the solution was boiled for 1½ hours. During this boiling, an additional 700 ml. of 1:1 sulfuric acid was added. The solution was cooled, 300 ml. of 1:1 sulfuric acid added, and then the solution was transferred to a separatory funnel. Ether was added to the funnel, and the heavy red etherate which formed as the lowest of three layers was removed. Gradually, 400 ml. of 1:1 sulfuric acid and more ether were added followed by withdrawal of the etherate as it formed. The combined etherate fractions were washed with ether saturated with 1:1 sulfuric acid, yielding 425 ml. (861 g.) of etherate. 400 ml. of distilled water was added to the etherate in small portions and the resulting mixture was allowed to stand at room temperature overnight. Ether evaporated. The rest of the ether was removed by heating at about 70° C. for 30 minutes, and the aqueous solution (545 ml.) of silicovanadotungstic acid resulting was cooled.

The aqueous solution of silicovanadotungstic acid was mixed with an equal volume of 1:1 sulfuric acid in a separatory funnel, and ether added to yield the red dense etherate. The red etherate layer was removed and an additional 400 ml. of sulfuric acid and more ether were used as before to force the silicovanadotungstic acid into the etherate. The total etherate amounting to 370 ml. (798 g.) was decomposed with 350 ml. of distilled water on a steam bath at about 70° C. The resulting solution was diluted to 500 ml. with distilled water and contained 0.55 g. silicovanadotungstic acid per ml. It was used as silicovanadotungstic acid stock solution in the following preparation.

To 500 g. of 30% silica aquasol which had been acidified with dilute nitric acid to pH 6 was added 321 g. of the above stock silicovanadotungstic acid and 364 g. of bismuth nitrate trihydrate in 220 ml. of dilute nitric acid. The sol was heated until it thickened and the gel was dried at 110° C. The preparation was calcined five hours at 540° C. in the presence of air, and then ground to 80 x 200 mesh particle size.

A 150 ml. portion of this catalyst was charged to the fluid bed reactor described above. A feed stream comprising 168 ml. of propylene, 938 ml. of air, and 503 ml. of water vapor per minute, S.T.P., was charged to the reactor at a reaction temperature of 430° C. Over 30 minutes of reaction time, 1.01 g. of acrolein and 0.21 g. of acetaldehyde were recovered. The conversion to acrolein was 8.1% at 25.4% yield. The conversion to acetaldehyde was 2.1%.

Example 2

Example 1 was repeated except that a reaction temperature of 390° C. was employed. Over 30 minutes of operation, 1.65 g. of acrolein and 0.28 g. of acetaldehyde were recovered. The conversion to acrolein was 12.9% at 31.4% yield. The conversion to acetaldehyde was 2.8%.

Example 3

The catalyst of Example 1 was tested at 390° C. with a feed stream comprising 226 ml. of propylene and 1260 ml. of air per minute, S.T.P. Over 22 minutes of operation, 1.67 g. of acrolein and 0.13 g. of acetaldehyde were recovered. The conversion to acrolein was 13.4% at 33.9% yield. The conversion to acetaldehyde was 1.3%.

Example 4

The catalyst of Example 1 was tested at 370° C., with the same feed stream as used in Example 1. Over 30 minutes of reaction, 1.71 g. of acrolein and 0.27 g. of acetaldehyde were obtained. The conversion to acrolein was 13.6% at 32.6% yield. The conversion to acetaldehyde was 2.6%.

Example 5

The catalyst of Example 1 was tested at 370° C. with no water vapor added to the feed, which consisted of 226 ml. of propylene and 1260 ml. of air per minute, S.T.P. Over 22 minutes of reaction, 1.72 g. of acrolein and 0.12 g. of acetaldehyde were recovered. The conversion to acrolein was 13.9% at 40.2% yield. The conversion to acetaldehyde was 2.2%.

Example 6

The catalyst was tested at 330° C., with a feed stream containing 168 ml. of propylene, 938 ml. of air, and 503 ml. of water vapor per minute, S.T.P. Over 30 minutes of operation, 1.07 g. of acrolein and 0.14 g. of acetaldehyde were recovered. The conversion to acrolein was 8.5% at 30.7% yield. The conversion to acetaldehyde was 1.4%.

Example 7

The catalyst of Example 1 was tested at 391° C. with a feed stream which consisted of 200 ml. of isobutylene and 1500 ml. of air per minute, S.T.P. Over 25 minutes of operation 1.49 g. of methacrolein was obtained as a product. The conversion to methacrolein was 9.5% at 19.9% yield.

Example 8

This example illustrates that bismuth oxide, in the absence of the heteropoly acid component is ineffective for converting propylene and oxygen to acrolein.

A composition comprising 30% of bismuth oxide on silica was prepared by adding a solution of bismuth nitrate in dilute aqueous nitric acid to an aqueous silica sol containing 30% silica. The composition was heated and stirred until it thickened and it was then dried in an oven at 140° C. After drying, it was calcined in a muffle furnace for 6 hours. The resulting catalyst was crushed, sieved and 150 cc. (40–120 mesh) was charged to the reactor described above. A feed gas stream comprising 166 ml. of propylene, 912 ml. of air and 664 ml. of water vapor per minute (S.T.P.) was fed to the reactor. The reaction temperature was 443° C. and the contact time 2 seconds. No acrolein was formed over 30 minutes of operation.

Examples 9 and 10 which follow illustrate that silicovanadotungstic acid, in the absence of the bismuth oxide component, with and without water vapor, respectively, is largely ineffective in converting propylene and oxygen to acrolein.

*Example 9*

A catalyst was prepared comprising 35% silicovanadotungstic acid on silica. The procedure was that of Example 1, with the omission of the bismuth nitrate. The preparation required 866 g. of 30% silica sol and 256 g. of the silicovanadotungstic acid stock solution. One hundred and fifty milliliters of 80 x 200 mesh catalyst was charged to the laboratory fluid bed reactor. The feed rates of Example 2 were repeated at 390° C. with water vapor added to the feed. The product contained only 0.06 g. of acrolein after 30 minutes operation. This corresponded to a conversion to acrolein of 0.5%.

*Example 10*

The feed rates of Example 3 were repeated with the catalyst of Example 8, at 390° C., without water vapor being added to the feed. After 30 minutes of operation, the product contained 0.06 g. of acrolein, corresponding to a conversion to acrolein of 0.5%.

Although the process of the invention has been illustrated in the preceding examples with catalyst compositions of specific proportions of bismuth oxide and silicovanadotungstic acid, it will be understood that any proportions of these components coming within the mentioned range will produce catalyst compositions that are highly active and selective for the preparation of acrolein from propylene and oxygen. The catalyst compositions of the invention are also active and selective for the conversion of isobutylene to methacrolein. Bismuth oxide is believed to function as a promoter in the catalyst compositions of the invention.

As previously noted, the exact relationship of the bismuth oxide and the silicovanadotungstic acid in the catalyst composition is not known. The phrase bismuth oxide and silicovanadotungstic acid as used herein and in the claims is intended to cover the catalyst composition as ready for use.

The catalyst composition can be prepared by using known spray drying techniques. Thus a slurry of the bismuth oxide or a bismuth compound yielding bismuth oxide on heating and the silicovanadotungstic heteropoly acid can be prepared and spray dried. The temperature of the spray drying operation will vary depending, for example, on the bismuth compound employed in preparing the catalyst.

While the invention relates to a process for the production of the well known compounds acrolein and methacrolein, it is particularly directed to the preparation of acrolein.

The invention has been described in detail with particular reference to preferred embodiments thereof, but it will be understood that variations and modifications can be effected within the spirit and scope of the invention as described hereinbefore and as defined in the appended claims.

What we claim is:

1. The process which comprises contacting, in the vapor phase, oxygen and an olefin from the group of propylene and isobutylene with a catalyst comprising a mixture of bismuth oxide and silicovanadotungstic acid at a gaseous hourly space velocity of about 100 to about 6000 and a temperature of about 250° C. to about 550° C. and obtaining a product comprising acrolein or methacrolein, respectively.

2. The process which comprises contacting propylene and oxygen, in the vapor phase, with a catalyst comprising a mixture of bismuth oxide and silicovanadotungstic acid which has been calcined at a temperature of 450° C.–600° C., at a gaseous hourly space velocity of about 200 to about 1000 and a temperature of about 300° C. to about 450° C. and obtaining a product comprising acrolein.

3. The process which comprises contacting isobutylene and oxygen, in the vapor phase, with a catalyst comprising a mixture of bismuth oxide and silicovanadotungstic acid which has been calcined at a temperature of 450° C.–600° C., at a gaseous hourly space velocity of about 200 to about 1000 and a temperature of about 350° C. to about 450° C. and obtaining a product comprising methacrolein.

4. The process of claim 1 wherein the reaction is carried out in the presence of an inert gaseous diluent.

5. The process of claim 1 wherein the reaction temperature is 300–450° C.

6. The process of claim 5 wherein the reaction is carried out in the absence of added water vapor.

7. The process of claim 1 wherein the oxygen is in the form of air.

8. The process of claim 1 wherein the proportions of olefin to oxygen are in the mole ratios of from 1:0.2 to 1:5.

9. The process of claim 1 wherein the reaction is carried out in the absence of added water vapor.

10. The process of claim 2 wherein the reaction is carried out in the absence of added water vapor.

11. The process of claim 3 wherein the reaction is carried out in the absence of added water vapor.

12. The process of claim 2 wherein the proportions of propylene to oxygen are in the mole ratios of from 1:0.5 to 1:2.

13. The process of claim 1 wherein the said catalyst is supported on silica.

14. A catalyst composition comprising a calcined mixture of from 5 to 60% by weight of bismuth oxide and from 5–75% by weight of silicovanadotungstic acid.

15. The composition of claim 14 wherein silica is employed as a carrier.

16. A catalyst composition comprising a calcined mixture of from 10 to 50% by weight of bismuth oxide and from 10 to 50% by weight of silicovanadotungstic acid.

17. A process for preparing a catalyst composition which comprises heating a mixture containing from 5 to 60% by weight of bismuth nitrate, calculated as bismuth oxide, and from 5 to 75% by weight of silicovanadotungstic acid, at a temperature of from 450–600° C.

18. The process according to claim 17 wherein the said mixture is added to a silica sol to form a slurry, and the said slurry then dried and calcined at 450–600° C.

References Cited by the Examiner

UNITED STATES PATENTS 2,941,007   6/1960   Callahan et al. _____ 260—604

FOREIGN PATENTS 605,502   10/1961   Belgium.
839,808   6/1960   Great Britain.

LEON ZITVER, *Primary Examiner.*

J. J. SETELIK, R. H. LILES, *Assistant Examiners.*